(12) United States Patent
Kottapalli et al.

(10) Patent No.: US 8,176,266 B2
(45) Date of Patent: May 8, 2012

(54) TRANSACTION BASED SHARED DATA OPERATIONS IN A MULTIPROCESSOR ENVIRONMENT

(75) Inventors: Sailesh Kottapalli, San Jose, CA (US); John H. Crawford, Saratoga, CA (US); Kushagra Vaid, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/943,314

(22) Filed: Nov. 10, 2010

(65) Prior Publication Data
US 2011/0055493 A1 Mar. 3, 2011

Related U.S. Application Data

(63) Continuation of application No. 11/027,623, filed on Dec. 29, 2004, now Pat. No. 7,984,248.

(51) Int. Cl.
*G06F 12/00* (2006.01)

(52) U.S. Cl. . 711/152; 711/150; 711/205; 711/E12.022; 711/E12.032

(58) Field of Classification Search .......................... None
See application file for complete search history.

(56) References Cited

U.S. PATENT DOCUMENTS

| | | | |
|---|---|---|---|
| 5,428,761 A * | 6/1995 | Herlihy et al. ................ 711/130 |
| 5,737,573 A | 4/1998 | Funaki et al. |
| 5,758,183 A | 5/1998 | Scales |
| 5,809,503 A | 9/1998 | Aoshima |
| 5,987,550 A | 11/1999 | Shagam |
| 6,076,126 A | 6/2000 | Shagam |
| 6,101,568 A * | 8/2000 | Richardson ................ 710/310 |
| 6,108,757 A | 8/2000 | Arshad |
| 6,240,413 B1 | 5/2001 | Learmont |
| 6,460,124 B1 | 10/2002 | Kagi et al. |
| 6,463,511 B2 | 10/2002 | Boatright et al. |
| 6,665,708 B1 | 12/2003 | Tikekar et al. |
| 6,684,398 B2 | 1/2004 | Chaudhry et al. |
| 6,704,841 B2 | 3/2004 | Chaudhry et al. |
| 6,718,839 B2 | 4/2004 | Chaudhry et al. |
| 6,721,855 B2 | 4/2004 | Chaudhry et al. |
| 6,862,664 B2 | 3/2005 | Tremblay et al. |

(Continued)

FOREIGN PATENT DOCUMENTS

JP 09-044402 A 2/1997

(Continued)

OTHER PUBLICATIONS

Oplinger et al., "Enhancing Software Reliability with Speculative Threads," ACM Sigplan Notices, Association for Computing Machinery, vol. 37, Issue 10, Oct. 2002, pp. 184-196.

(Continued)

*Primary Examiner* — Reginald Bragdon
*Assistant Examiner* — Aracelis Ruiz
(74) *Attorney, Agent, or Firm* — David P. McAbee

(57) ABSTRACT

The apparatus and method described herein are for handling shared memory accesses between multiple processors utilizing lock-free synchronization through transactional-execution. A transaction demarcated in software is speculatively executed. During execution invalidating remote accesses/requests to addresses loaded from and to be written to shared memory are tracked by a transaction buffer. If an invalidating access is encountered, the transaction is re-executed. After a pre-determined number of times re-executing the transaction, the transaction may be re-executed non-speculatively with locks/semaphores.

9 Claims, 7 Drawing Sheets

U.S. PATENT DOCUMENTS

| | | | |
|---|---|---|---|
| 6,981,108 B1 | 12/2005 | Zeira et al. | |
| 7,103,880 B1 * | 9/2006 | Morris et al. | 717/140 |
| 7,685,365 B2 | 3/2010 | Rajwar et al. | |
| 7,856,537 B2 | 12/2010 | Kumar et al. | |
| 2002/0046334 A1 | 4/2002 | Wah Chan et al. | |
| 2003/0079094 A1 | 4/2003 | Rajwar et al. | |
| 2003/0182465 A1 | 9/2003 | Moir et al. | |
| 2004/0059898 A1 | 3/2004 | Baxter et al. | |
| 2004/0153687 A1 | 8/2004 | Moir et al. | |
| 2004/0187115 A1 * | 9/2004 | Tremblay et al. | 718/100 |
| 2005/0086446 A1 | 4/2005 | McKenney et al. | |
| 2005/0177831 A1 | 8/2005 | Goodman et al. | |
| 2006/0004998 A1 | 1/2006 | Saha et al. | |
| 2006/0085591 A1 * | 4/2006 | Kumar et al. | 711/113 |

FOREIGN PATENT DOCUMENTS

| | | |
|---|---|---|
| JP | 09-231124 A | 9/1997 |
| JP | 2000-267815 A | 9/2000 |
| WO | 02/093385 A2 | 11/2002 |
| WO | 02/093385 A3 | 10/2003 |
| WO | 2004/075044 A2 | 9/2004 |
| WO | 2004/075045 A2 | 9/2004 |
| WO | 2006/071969 A1 | 7/2006 |

OTHER PUBLICATIONS

Herlihy et al., "Transactional Memory: Architectural Support for Lock-free Data Structures", Proceedings of The Annual International Symposium on Computer Architecture, May 16-19, 1993, pp. 289-300.

International Search Report and Written Opinion received for PCT Patent Application No. PCT/US2005/047376, mailed on Apr. 25, 2006, 13 pages.

Shavit et al., "Software Transactional Memory," Proceedings of the Annual ACM Symposium on Principles of Distributed Computing, 1995, pp. 204-213.

International Preliminary Report on Patentability received for PCT Application No. PCT/US2005/047376, mailed on Jul. 12, 2007, 8 pages.

Office Action Received for United Kingdom Patent Application No. GB0818238.8 mailed on Feb. 9, 2009, 1 Page.

Office Action Received for United Kingdom Patent Application No. GB0818238.8 mailed on Nov. 13, 2008, 3 Pages.

Office Action Received for German Patent Application No. 11 2005 003 339.2 mailed on Jan. 8, 2010, 3 Pages of German Office Action including 1 page of English Translation.

Office Action Received for German Patent Application No. 11 2005 003 339.2 mailed on Oct. 28, 2008, 6 Pages of German Office Action including 2 pages of English Translation.

Office Action Received for Chinese Patent Application No. 200580045410.7 mailed on Feb. 13, 2009, 17 Pages of Chinese Office Action including 10 pages of English Translation.

Office Action Received for Japanese Patent Application No. 2007-549621 mailed on Jun. 15, 2010, 5 Pages of Japanese Office Action including 3 pages of English Translation.

Office Action Received for Japanese Patent Application No. 2007-549621 mailed on Nov. 9, 2010, 2 pages of Japanese Office Action including 1 page of English Translation.

Office Action Received for United Kingdom Patent Application No. GB0714433.0 mailed on Jun. 5, 2008, 2 Pages.

Office Action Received for United Kingdom Patent Application No. GB0714433.0 mailed on Jan. 4, 2008, 5 Pages.

Office Action Received for Chinese Patent Application No. 200580045410.7 mailed on Jul. 13, 2011, 9 Pages of Chinese Office Action including 5 pages of English Translation.

Office Action Received for German Patent Application No. 11 2005 003 839.4 mailed on Dec. 21, 2011, 4 pages of German Office Action and 3 pages of English Translation.

Office Action Received for German Patent Application No. 11 2005 003 838.6 mailed on Jan. 13, 2012, 6 pages of German Office Action and 3 pages of English Translation.

* cited by examiner

TRANSACTION BASED SHARED DATA OPERATIONS IN A MULTIPROCESSOR ENVIRONMENT

CROSS-REFERENCE TO RELATED APPLICATION

This application is a Continuation of U.S. patent application Ser. No. 11/027,623, now U.S. Pat. No. 7,984,248, filed on Dec. 29, 2004, entitled "TRANSACTION BASED SHARED DATA OPERATIONS IN A MULTIPROCESSOR ENVIRONMENT". This application is incorporated herein by reference in its entirety.

FIELD

This invention relates to the field of integrated circuits and, in particular, to shared data operations between multiple integrated circuits, cores, and threads.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. An integrated circuit typically comprises a single processor die, where the processor die may include any number of cores or logical processors.

As an example, a single integrated circuit may have one or multiple cores. The term core usually refers to the ability of logic on an integrated circuit to maintain an independent architecture state, where each independent architecture state is associated with dedicated execution resources. Therefore, an integrated circuit with two cores typically comprises logic for maintaining two separate and independent architecture states, each architecture state being associated with its own execution resources, such as low-level caches, execution units, and control logic. Each core may share some resources, such as higher level caches, bus interfaces, and fetch/decode units.

As another example, a single integrated circuit or a single core may have multiple logical processors for executing multiple software threads, which is also referred to as a multi-threading integrated circuit or a multi-threading core. Multiple logical processors usually share common data caches, instruction caches, execution units, branch predictors, control logic, bus interfaces, and other processor resources, while maintaining a unique architecture state for each logical processor. An example of multi-threading technology is Hyper-Threading Technology (HT) from Intel® Corporation of Santa Clara, Calif., that enables execution of threads in parallel using a signal physical processor.

Current software has the ability to run individual software threads that may schedule execution on a plurality of cores or logical processors in parallel. The ever increasing number of cores and logical processors on integrated circuits enables more software threads to be executed. However, the increase in the number of software threads that may be executed simultaneously have created problems with synchronizing data shared among the software threads.

One common solution to accessing shared data in multiple core or multiple logical processor systems comprises the use of locks to guarantee mutual exclusion across multiple accesses to shared data. As an example, if a first software thread is accessing a shared memory location, the semaphore guarding the shared memory location is locked to exclude any other software threads in the system from accessing the shared memory location until the semaphore guarding the memory location is unlocked.

However, as stated above, the ever increasing ability to execute multiple software threads potentially results in false contention and a serialization of execution. False contention occurs due to the fact that semaphores are commonly arranged to guard a collection of data, which, depending on the granularity of sharing supported by the software, may cover a very large amount of data. For this reason, semaphores act as contention "amplifiers" in that there may be contention by multiple software threads for the semaphores, even though the software threads are accessing totally independent data items. This leads to situations where a first software thread locks a semaphore guarding a data location that a second software thread may safely access without disrupting the execution of the first software thread. Yet, since the first software thread locked the semaphore, the second thread must wait until the semaphore is unlocked, resulting in serialization of an otherwise parallel execution.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as a specific number of physical/logical processors, specific transaction buffer fields, and specific processor logic and implementations in order to provide a thorough understanding of the present invention. It will be apparent, however, to one skilled in the art that these specific details need not be employed to practice the present invention. In other instances, well known components or methods, such well-known functional blocks of a microprocessor, etc., have not been described in detail in order to avoid unnecessarily obscuring the present invention.

The apparatus and method described herein are for handling shared memory accesses between multiple software threads utilizing lock-free synchronization through transactional-execution. It is readily apparent to one skilled in the art, that the method and apparatus disclosed herein may be implemented in any level computer system, such as personal digital assistants, mobile platforms, desktop platforms, and server platforms, as well as with any number of integrated circuits, cores, or logical processors. For example, a multiprocessor system with four integrated circuits may use the method and apparatus herein described to manage shared accesses to a memory shared by any four of the integrated circuits.

Figure 1:
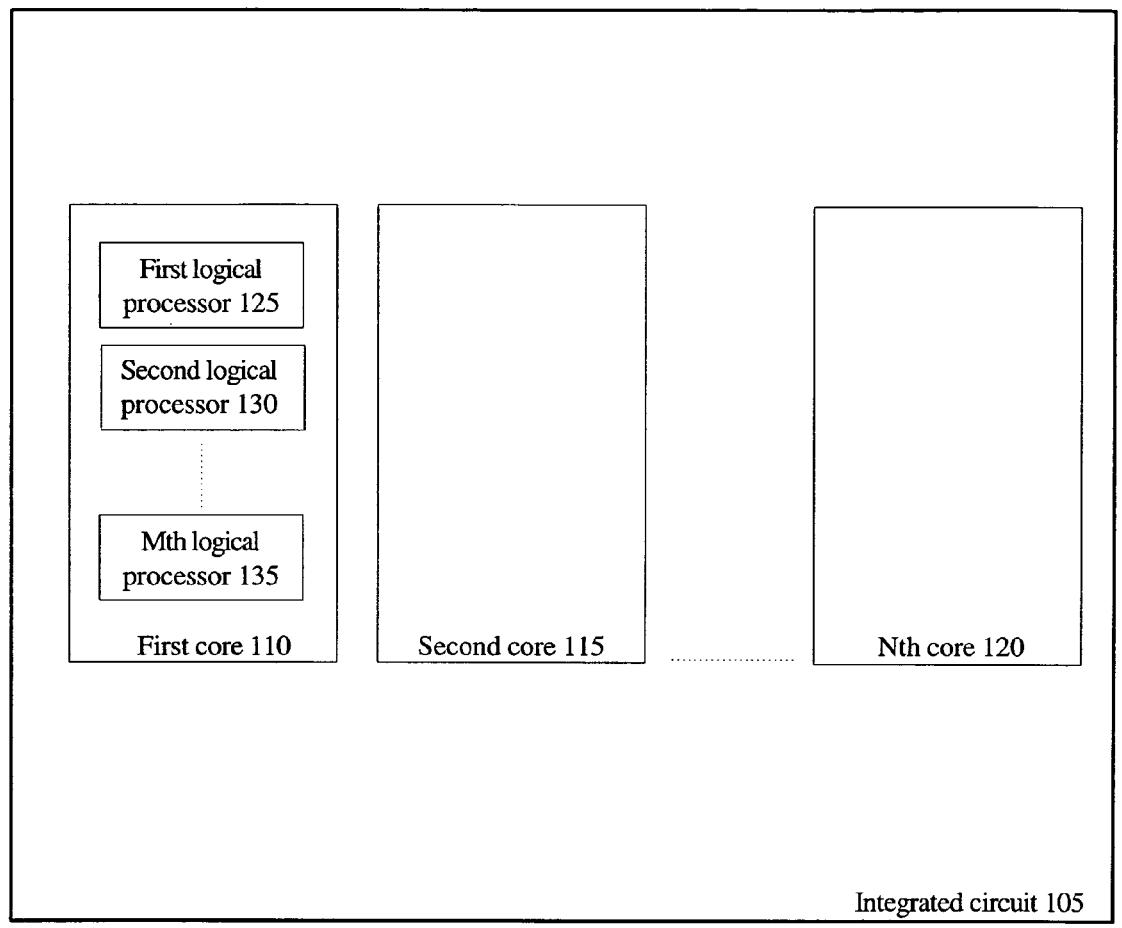
FIG. 1 illustrates an integrated circuit having N cores and M logical processors in each of the N cores.

In FIG. 1 integrated circuit 105, which may implement transactional execution, is shown. In one embodiment, integrated circuit 105 is a microprocessor capable of operating independently from other microprocessors. Alternatively, integrated circuit 105 is a processing element that operates in conjunction with a plurality of processing elements.

Integrated circuit 105 illustrates first core 110, second core 115, and Nth core 120. A core, as used herein, refers to any logic located on an integrated circuit capable to maintain an independent architecture state, wherein each independently maintained architecture state is associated with at least some dedicated execution resources. Execution resources may include arithmetic logic units (ALUs), floating-point units (FPUs), register files, operand registers for operating on single or multiple integer and/or floating-point data operands in serial or parallel, and other logic for executing code. Moreover, a plurality of cores may share access to other resources, such as high-level caches, bus interface and control logic, and fetch/decode logic.

As an illustrative example, integrated circuit 105 has eight cores, each core associated with a set of architecture state registers, such as general-purpose registers, control registers, advanced programmable interrupt control (APIC) registers, machine state registers (MSRs), or registers for storing the state of an instruction pointer, to maintain an independent architecture state. Furthermore, each set of architecture state registers are exclusively associated with individual execution units.

Integrated circuit 105 also illustrates core 110 comprising first logical processor 125, second logical processor 130, and Mth logical processor 135. A logical processor, as used herein, refers any logic located on an integrated circuit capable to maintain an independent architecture state, wherein the independently maintained architecture states share access to execution resources. As above, each logical processor has a set of architecture state registers to maintain an independent architecture state; however, each of the architecture states share access to the execution resources. Consequently, on any single integrated circuit there may be any number of cores and/or any number of logical processors. For the purpose of illustration, the term processor will be referred to in discussing the operation of a core and/or a logical processor when discussing the apparatus and method used for transactional execution.

Figure 2:
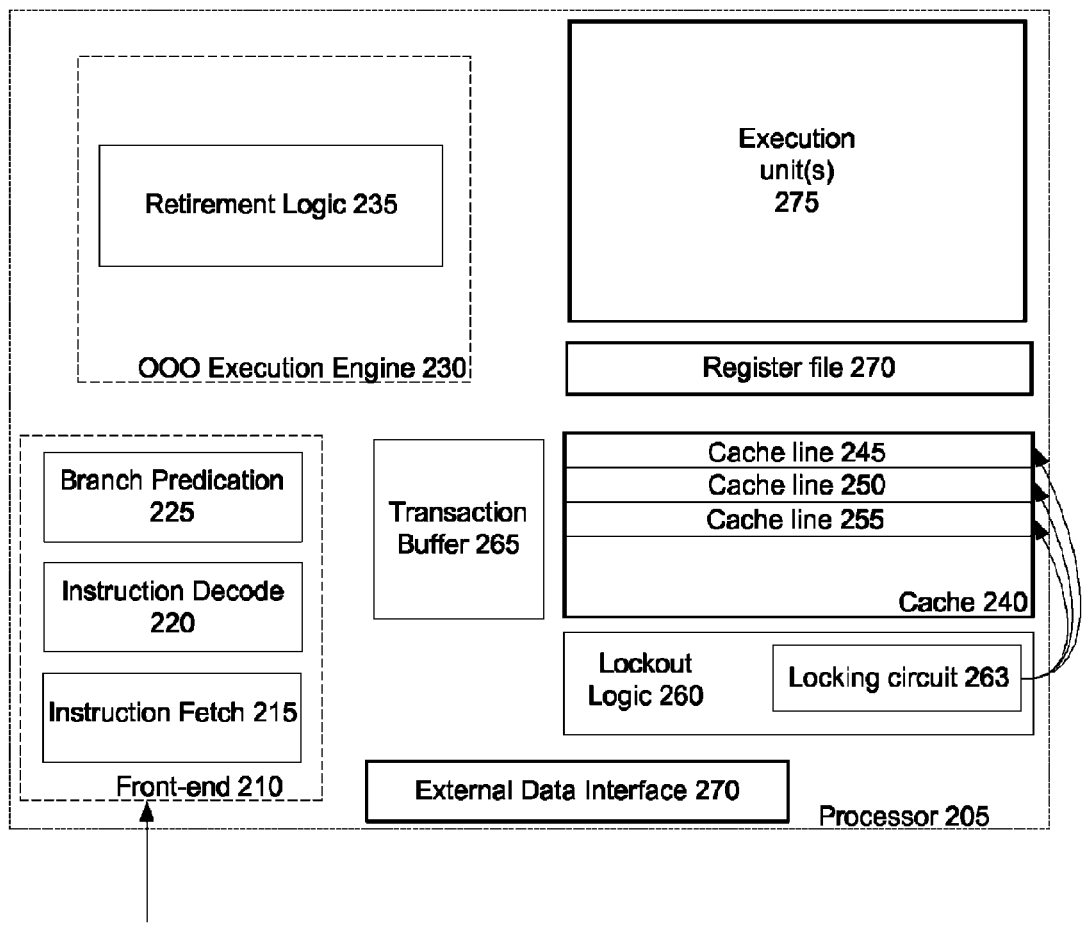
FIG. 2 illustrates an embodiment of an integrated circuit for implementing transactional execution.

Referring to FIG. 2, an embodiment of an integrated circuit is depicted to illustrate a specific implementation of transactional execution. However, it is readily apparent that the method and apparatus described in reference to FIG. 2 may be implemented in any level system, such as the system depicted in FIG. 5. In one embodiment, integrated circuit 205 is capable of out-of-order speculative, where instructions are able to be executed in an order that is different that given in a program. Alternatively, processor 205 is capable of in-order execution, where the instructions are issued and executed in original program order.

Integrated circuit 205 may comprise any number of processors, which may be cores or logical processors. For instance, integrated circuit 205 has eight cores, each core having two logical processors, which would allow for execution of 16 software threads on integrated circuit 205 at one time. Consequently, integrated circuit 205 is typically referred to as a multi-threading multi-core processor. In FIG. 2, integrated circuit 205 is depicted individually, as to not obscure the invention; yet, integrated circuit 205 may operate individually or in cooperation with other processors.

Integrated circuit 205 may also include, but is not required to include, any one or any combination of the following, which are not specifically depicted: a data path, an instruction path, a virtual memory address translation unit (a translation buffer), an arithmetic logic unit (ALU), a floating point calculation unit capable of executing a single instruction or multiple instructions, as well as capable to operate on single or multiple data operands in serial or in parallel, a register, an interrupt controller, an advanced programmable interrupt controller (APIC), a pre-fetch unit, an instruction re-order unit, and any other logic that is be used for fetching or executing instructions and operating on data.

Integrated circuit 205 illustrates front-end 210. Front-end 210 is shown as including instruction fetch 215, instruction decode 220, and branch predication 225. Front-end 210 is not limited to only including the logic shown, but may also include other logic, such as external data interface 265 and a low-level instruction cache. Front-end 210 fetches and decodes instructions to be executed by integrated circuit 205. As shown, front-end 210 also includes branch prediction logic 225 to predict instructions to be fetched and decoded. Front-end 210 may fetch and decode fixed length instructions, variable length instructions, macro-instructions, or instructions having individual operations.

An instruction usually includes multiple operations to be performed on data operands and is commonly referred to as a macro-instruction, while the individual operations to be executed are commonly referred to as micro-operations. However, an instruction may also refer to a single operation. Therefore, a micro-operation, as used herein, refers to any single operation to be performed by integrated circuit 205, while an instruction refers to a macro-instruction, a single operation instruction, or both. As an example, an add macro-instruction includes a first micro-operation to read a first data operand from a first associated address, a second micro-operation to read a second data operand from a second associated address, a third micro-operation to add the first and the second data operand to obtain a result, and a fourth micro-operation to store the result in a register location.

Transactional execution typically includes grouping a plurality of instructions or operations into a transaction or a critical section of code. In one embodiment, hardware in integrated circuit 205 groups macro-operations into transactions. Identifying transactions in hardware includes several factors, such as usage of lock acquire and lock releases, nesting of transactions, mutual exclusion of non-speculative memory operations, and overlay of memory ordering requirements over constructs used to build transactions. In another embodiment, transactions are demarcated in software. Software demarcation of transactions is discussed in more detail in reference to FIG. 5.

Integrated circuit 205 further comprises execution units 275 and register file 270 to execute the groups of macro-operations, also referred to as transactions and critical sections. Unlike traditional locking techniques, transactional execution usually entails speculatively executing a transaction/critical section and postponing state updates until the end of speculative execution, when the final status of the transaction is determined. As an example, a critical section is identified by front-end 210, speculatively executed, and then retired by retirement logic 235 only if remote agents, such as another core or logical processor have not made an invalidating request to the memory locations accessed during execution of the critical section.

As illustrative examples, remote agents include memory updating devices, such as another integrated circuit, processing element, core, logical processor, or any processor/device that is not scheduled to execute or is not executing the pending transaction. Typically, invalidating requests comprise requests/accesses by a remote agent to memory locations manipulated by micro-operations within the transaction, requests to lock a semaphore guarding the memory locations manipulated by micro-operations within the transaction, or requests by a remote agent for ownership of memory locations manipulated by micro-operations within the transaction. Invalidating requests will be discussed in more detail in reference to FIG. 3.

If at the end of executing the transaction/critical section the results are deemed inconsistent or invalid, then the transaction/critical section is not retired and the state updates are not committed to registers or memory. Additionally, if the transaction is not retired, then two options for re-executing the transaction include: (1) speculatively re-executing the transaction as previously executed or (2) non-speculatively re-executing the transaction utilizing locks/semaphores.

Speculative execution of transactions may include memory updates and register state updates. In one embodiment, integrated circuit 205 is capable of holding and merging speculative memory and register file state updates to ensure transaction execution results are valid and consistent before updating memory and the register file. As an illustrative example, integrated circuit 205 holds all instructions/micro-operations results identified as part of the same transaction in a speculative/temporary state for an arbitrary period of time. To accomplish the holding and merging of speculative memory and register file state updates, special register checkpoint hardware and operand bypass logic is used to store the speculative results in temporary registers.

In another embodiment, integrated circuit 205 is capable of decoupling register state updates and instruction retirement from memory updates. In this embodiment, speculative updates are committed to register file 370 before speculation is resolved; however, the memory updates are buffered until after the transaction is retired. Therefore, one potential advantage is each individual instruction or micro-operation within a transaction may be retired immediately after execution. Furthermore, the decoupling of the register state update and the memory update potentially reduces the extra registers for storage of speculative results before committing to architectural register file 270.

However in this embodiment, speculatively updating register file 270 entails treating each update to register file 270 as a speculative update. Register re-use and allocation policies may account for updates to register file 270 as being speculative updates. As an illustrative example, input registers that are used for buffering data for transactions are biased against receiving new data during the pendancy of commitment of the transaction. In this example, input registers used during the transaction are biased against receiving new data; therefore, if the speculative execution fails or needs to be re-started, the input register set is usually able to be re-used without re-initialization, as other registers that are not part of the input register set would be used first.

In another example, if input registers receive new data during speculative execution or pendancy of commitment of the transaction, the state of the input registers re-used are stored in a separate storage area, such as another register. The storage of the input register's original contents allows the input registers to be reloaded with their original contents in case of an execution failure or initiation of re-execution. The processor temporarily storing a registers contents and then re-loading upon re-execution is typically referred to as spilling and refilling.

The consistency of memory accesses to a shared memory, such as cache 240, within a transaction/critical section may be tracked to ensure memory locations read from still have the same information and memory locations to be updated/written-to have not been read or updated by another agent. As a first example, a memory access is a load operation that reads/loads data, a data operand, a data line, or any contents of a memory location. As a second example, a memory access includes a memory update, store, or write operation.

In one embodiment, transaction buffer 265 tracks accesses to lines of data, such as cache lines 245, 250, and 255, in shared memory, such as cache 240. As an illustrative example, cache lines 245-255 comprise a line of data, an associated physical address, and a tag. The associated physical address references a memory location external to integrated circuit 205 or a memory location located on integrated circuit 205.

Figure 3:
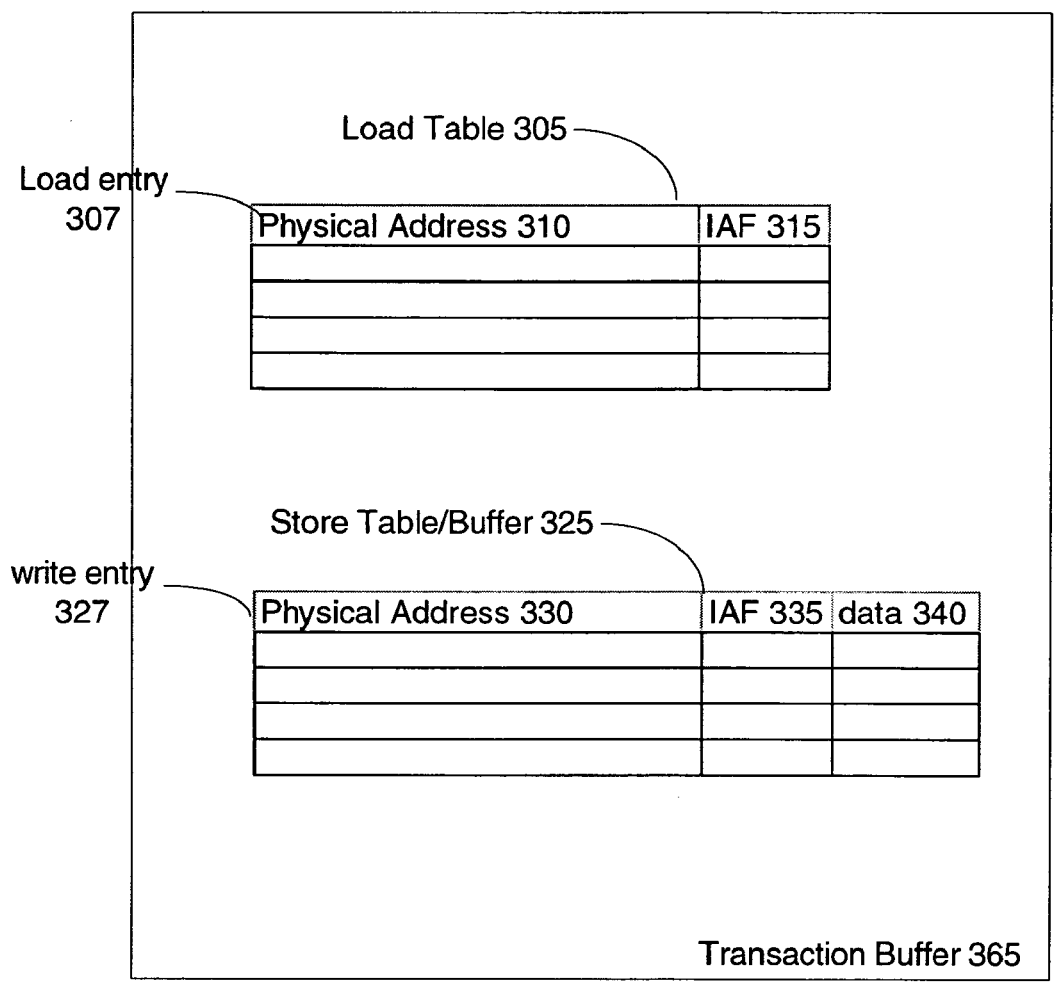
FIG. 3 illustrates an embodiment of the transaction buffer shown in FIG. 3.

Turning to FIG. 3, an embodiment of transaction buffer 265 is illustrated. Transaction buffer 265 may include transaction tracking logic to track invalidating requests/accesses by remote agents to each address loaded from and each address to be written to a shared memory within a transaction. As illustrative examples, remote agents include other processing elements, such as another logical processor, core, integrated circuit, processing element, or any processor/device that is not scheduled to execute or is not executing the pending transaction.

In one embodiment, transaction buffer 265 includes a load table 305 and a store/write buffer 325 to track the loads/reads and the stores/writes, respectively, during execution of a pending transaction. Here, the load table 305 stores a load entry, such as load entry 307, to correspond to each line of data loaded/read from a shared memory during execution of a pending transaction/critical section. In one embodiment, load entry comprises a representation of a physical address 310 and an invalidating access field (IAF) 315. As first example, representation of physical address 310 includes the actual physical address used to reference the memory location. As a second example, the representation includes a coded version or a portion of the physical address, such as a tag value, to reference the loaded data line, along with length/size information. The length of loaded data may be implicit in the design; therefore, no specific reference to length/size of the data loaded is required. In one embodiment, the implicit length/size of loaded data is a single cache line.

As an illustrative example, IAF 315 has a first value when load entry 307 is first stored in load table 305 and is changed to a second value when a remote agent makes an invalidating access or invalidating access request to the memory location referenced by physical address 310. For instance, an invalidating request/access constitutes a remote agent writing to the memory location referenced by physical address 310 during execution of the pending critical section, where physical address 310 represents a memory location that was read from during execution of the pending critical section. As a simplified example, IAF 315 is initialized to a first logical value of 1 upon storing load entry 307, load entry 307 comprising physical address 310, which references a memory location loaded from during execution of a critical section. If a remote agent, writes to the memory location referenced by physical address 310 during execution of the pending critical section, then IAF 315 field is changed to a second value of 0 to represent that a remote agent made an invalidating access to the memory location referenced by load entry 307.

In one embodiment, load table 305 may also be used to track invalidating lock/semaphore requests made by remote agents. When a transaction is executed, a semaphore or separate load entry, such as load entry 307 is used to track a semaphore for the transaction. A semaphore variable may be tracked using a common load operation for the semaphore variable, the load operation being tracked in a similar manner as discussed above. In fact, a semaphore load entry, such as load entry 307, to track invalidating requests to the semaphore comprises physical address field 310 and IAF 315. Physical address field 310 may comprise a representation of a physical address that the semaphore value is stored at.

Analogous to the operation of creating a load entry explained above, IAF 315 is loaded with a first value upon storing semaphore load entry 307 in load table 305 to track a locking variable/semaphore for the current transaction. If a remote agent requests or acquires a lock with the semaphore, referenced by the physical address 310, during execution of the pending transaction, then IAF 315 is set to a second value to represent that a remote agent requested/obtained a lock on the transaction during execution. It is apparent that multiple agents may track a lock; however, the invalidation is performed when one of the agents acquires an actual lock.

Figure 4:
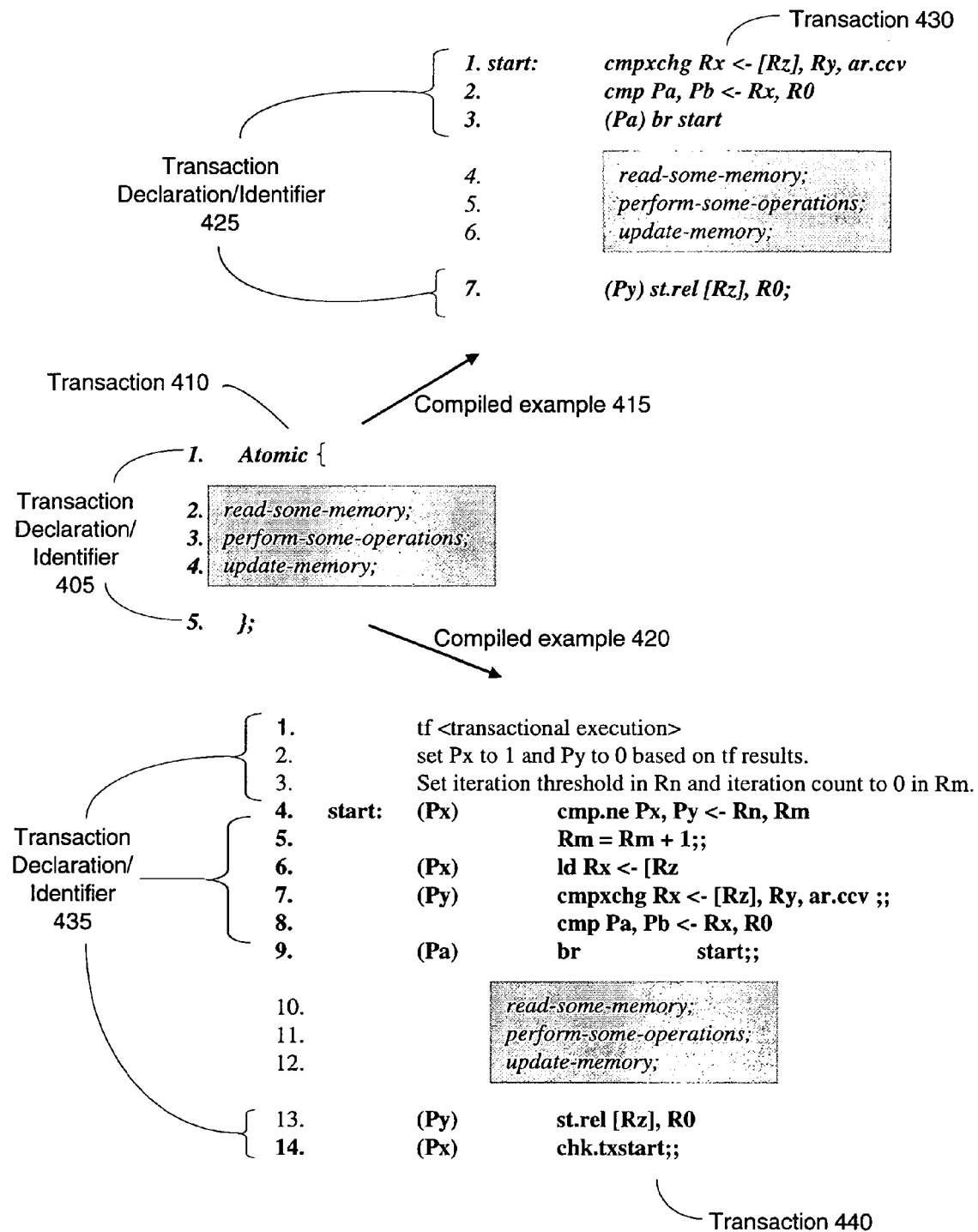
FIG. 4 illustrates a transaction demarcated in software code, the software code shown compiled into a first and a second embodiment of compiled code.

Load table 305 is not limited to the embodiment shown in FIG. 4. As an example, transaction buffer 265 determines which load entries, such as load entry 307, are empty (entries not used by the current transaction and may have default or garbage data) and which load entries are full (entries created by the current transaction). Here, a counter may be used to keep track of an allocation pointer that references the current load entry. Alternatively, another field, such as an allocation tracking field (ATF), is present in each load entry to track whether that load entry is empty or full. As an example, load entry 307 has an ATF with a first value, such as a logical 1, to represent an empty load entry that has not been created by the current transaction. The ATF in load entry 307 is changed to a second value, such as a logical 0, when load entry 307 is created by the current transaction.

In another embodiment, the size/length of the data line loaded/read is not implicit, but rather, another field, such as a length field, is present in load table 305 to establish the length/size of the data loaded. Load table 305 may be an advanced load address table (ALAT) known in the art for tracking speculative loads.

Referring again to FIG. 3, store write buffer 325 stores a write entry, such as write entry 327, to correspond to each line of data or partial line of data to be written to/updated within a shared memory during execution of a pending transaction/critical section. For example, write entry 327 comprises a representation of a physical address 330, an invalidating access field (IAF) 335, and a data hold field 340. As a first example, representation of physical address 330 includes the actual physical address used to reference a memory location to be written to at the end or during execution of a pending critical section. As a second example, the representation includes a coded version or a portion of the physical address, such as a tag value, to reference a data line to be written to at the end of execution a pending critical section.

For the above example, IAF 335 has a first value when write entry 327 is first stored in write table 325 and is changed to a second value when an invalidating access to a memory location reference by physical address 330 is made by a remote agent. In one embodiment, an invalidating access constitutes a remote agent writing to the memory location referenced by physical address 330 during execution of the pending critical section. Additionally, an invalidating access constitutes a remote agent reading from physical address 330 during execution of the pending critical section. Another invalidating access may constitute a remote agent gaining ownership of the memory location referenced by physical address 330. As a simplified example, IAF 335 is initialized to a first logical value of 1 upon storing write entry 327. If a remote agent reads or writes to the memory location referenced by physical address 330 during execution of the pending critical section, then IAF 325 is changed to a second logical value of 0 to represent that a remote agent has made an invalidating access to the memory location referenced by write entry 327.

Write entry 327 further illustrates data hold field 340 to buffer/hold the speculative data to be written. Data hold field 340 may also be used to track which portion of a tracked line of data contains new data versus which portion has not been targeted by the speculative store. Tracking the changed portions may aid in merging speculative data to actual memory locations later during the commitment process.

In one embodiment, ownership of a line to be written to, from a store operation, is gained upon execution and retirement of the individual operation within a transaction. As an alternative to pre-fetching ownership, at the retirement of each individual write/store micro-operation, the ownership of the physical address to be written to is not gained until the end of the transaction before transaction retirement. In either embodiment, at the end of the transaction, if ownership was relinquished during execution of the transaction, then the transaction is not retired (fails), because an invalidating access was made. Once the transaction is to be retired, ownership of each line to be written to is not relinquished until after all of the memory updates have been committed. If a remote agent requests ownership of a line during retirement, the request may be queued and held pending until after all of the memory updates/writes have been committed.

Write table 325 is not limited to what is shown in FIG. 4. It may, for example, include a pinning field, not depicted, to block snoops from remote agents to a shared memory, such as a cache, when set. The pinning field of a write entry is set to a first value to allow snoops to a corresponding physical address and set to a second value when a cache line is pinned to block snoops to the cache line by remote agents. A pinning field may be especially useful during the commit process to block snoops and to disallow any ownership changes. As stated above, any requests for ownership from a remote agent may be queued until after the transaction has been committed. One exemplary method to implement the pinning field is to block snoops for a predetermined length of time, when the pinning field is set, wherein the predetermined length of time is based on the number of store buffers present.

Write table 325 may also include a length field, such as the length field discussed in reference to load table 305 above, for storing the length of speculative data to be written. Any amount of other fields or combinations of fields may be included in store table/buffer 325. For instance, a remote agent field is used to track a processor ID or other ID to identify the remote agent that made an invalidating access.

Transaction buffer 265 may be implemented in hardware or firmware. In another instance, transaction buffer 365 is implemented in software and executed by integrated circuit 205. In yet another example, transaction buffer is implemented in microcode.

After executing all the micro-operations within a critical section/transaction, a transaction is typically committed, if no invalidating accesses occurred during execution of a pending critical section. After retirement, the transaction is typically committed in an atomic manner. As an example, atomically writing/committing a pending critical section includes writing each and every data line buffered during execution of a critical section to a shared memory.

In one embodiment, a pending transaction is retired by retirement logic 235, shown in FIG. 2, after checking transaction buffer 265 for invalidating accesses that were tracked during execution of the pending critical section. As an example, for a pending transaction to be retired, each load entry IAF stored in load table 305 and each write entry IAF stored in store table/buffer 325, which is associated with the pending transaction is checked. Additionally, any load entries that were created to track a lock variable or a semaphore for the pending transaction are also checked to ensure no invalidating access was made by a remote agent requesting the lock or the semaphore. If no invalidating accesses are discovered then the transaction retirement is granted and the store buffers are pinned. Once pinned and retirement is granted, which is done simultaneously, the memory updates may be performed in a serial fashion. Once completed, the "pin" status is removed, the line is relinquished, and the transaction is considered committed.

As a simplified example, a transaction includes a micro-operation to read from location 0001 and write the value 1010 to location 0002. When executing the first micro-operation, load table 305 would store load entry 307 comprising physical address field 310, which represents location 0001, and IAF 315 with a first value 1. When executing the second micro-operation store table 325 would store write entry 327 comprising physical address 330, which represents location 0002, IAF 335 with a first value of 1, and 1010 in data field 340. Additionally, the load and write entries may further comprise size/length information or other fields described above. If a remote agent writes to location 0001 during execution or while the transaction is still pending, then IAF 315 is set to the second value of 0 to represent an invalidating access was made. Upon trying to retire the transaction, IAF 315 represents an invalidating access, so the transaction would not be retired and the value 1010 would not be written to location 0002. However, if no remote agent writes to location 0001 and no remote agents reads/writes to location 0002 as represented by 1's in IAF 315 and 335, then the transaction is retired and the value 1010 is written to location 0002.

After determining an invalidating access occurred during the pending transaction, therefore, not retiring the transaction, there are a number of options. The first option includes re-executing the transaction. As discussed above, the input registers are either (1) re-initialized to their original state, if they received new data during pendancy of the transaction or (2) are already present in their original state, if they received no new data during pendancy of the transaction. Consequently, the transaction is speculatively re-executed in the same manner as before. A second option includes speculatively re-executing the transaction using a back-off algorithm in conjunction with the remote agent that made the invalidating access. As an example, an exponential back-off algorithm is used to attempt to complete the transaction without the remote agent contending for the same data. Another option includes using a software non-blocking mechanism, known in the art, to re-execute the transaction. A fourth option includes re-executing the transaction non-speculatively with locks/semaphores after re-executing the transaction speculatively a predetermined number of times. The semaphores effectively locking the addresses to be read from and written to during the transaction.

The fourth option, utilizing locks/semaphores as a failure mechanism, may be implemented in hardware, software, or a combination of hardware for executing software. For instance, in software implemented lockout mechanism, a semaphore is used for locking access to any granularity of memory locations. Each processor that wants to access a certain memory location contends for the semaphore guarding that location. If the semaphore is set to a first value representing no lock, then the first processor flips the semaphore to a second value representing that address/memory location is locked. Flipping the semaphore to the second value ensures through software that the processor, who flipped the semaphore, gets exclusive access to that memory location, and likely a range of memory locations guarded by that semaphore. Integrated circuit 205 may have separate lockout logic 260 to invoke/execute the semaphores in software or may simply use existing execution logic to execute/invoke the software lockouts. The semaphore may be software implemented; therefore, it the semaphore may be present in system memory (not depicted).

As another example of implementing lockout logic 260, shown in FIG. 2, lockout logic 260 or software executed on lockout logic 260 uses a lockout mechanism for preventing at least one remote agent access to designated lines of a shared memory. In one embodiment, the lockout logic includes a lock bit. As a first example, in hardware, the lock bit is in a register or in the cache line. As a second example, the lock bit is represented in software that is executed on lockout logic 260 and present in system memory.

When the lock bit has a first value access to predetermined or designated lines of shared memory is allowed. However, when the lock bit has a second value access to the designated lines of shared memory is prevented. The lock bit may be present in cache 240, in the lockout logic 260, any other memory in processor 205, or system memory. Any granularity of data lines may be locked by a single semaphore or by setting a single bit. As an example, $2^S$ lines are locked by the setting of a single locking bit.

As an example of the use of semaphores as a fail safe mechanism, a transaction is executed a first number of time, such as five times, but during each execution a remote agent makes an invalidating access to an address that was read from during execution of the transaction, such as illustrative address 0001. Looping through the transaction code a sixth time, an execution threshold of six is met. Once the threshold or predetermined number of executions is met, a semaphore is used for executing the transaction.

In a software implementation, a semaphore guarding address 0001 is contended for. If address 0001 is not currently locked by the semaphore, then the semaphore is flipped in value to represent that it is currently locked. The transaction is then re-executed non-speculatively.

As an alternative, in a hardware implementation, a locking circuit, such as locking circuit 263, which may consists of a single transistor or any number of transistors, sets a locking bit associated with address 0001 to a second value preventing remote agents access at least to address 0001 during the sixth execution of the transaction.

Locking of data lines is not limited to the use of semaphores or a locking bit, but includes any method or apparatus for preventing access to lines of data, whether implemented in hardware or software. As another example, a tri-state device is used to prevent interconnect access to lines of data.

Turning to FIG. 4, an example of a transaction demarcated in software is shown. As stated above, a transaction typically includes a group of instructions/micro-operations to be executed. Therefore, a transaction declaration may be any method of demarcating a transaction. In FIG. 4, transaction 410 has examples of some operations, such as read memory, perform operations, and update/write to memory. Transaction 410 is demarcated by transaction declaration/identifier 405, which is depicted as Atomic { . . . }. However, a transaction declaration is not so limited. As a simple example, a pair of brackets grouping a plurality of operations or instructions is a transaction declaration/identifier to identify the bounds of a transaction/critical section.

An instance of transaction declaration 405 compiled is shown in complied example 415. Transaction 430's bounds are identified by transaction identifier 425; therefore, a processor executing the transaction is able to identify the micro-operations that make up a transaction/critical section from the identifier. Another instance of transaction declaration 405 compiled is shown in complied example 425. In this instance, transaction declaration 435 identifies the bounds of transaction 440.

To step through this example, lines 1 through 3 identify transactional execution, sets predicates Px to 1 and Py to 0, initializes a count variable to 0 in Rm, and the threshold of the count in Rn. Predicates typically include one type or path of execution when the predicate has one value and another type or path of execution when the predicate has another value. In lines 4-9, the count variable is initialized to a number representing the amount of times the transaction is to be executed speculatively, the count variable is then compared to a threshold or otherwise evaluated to see if the locking predicate should be set to execute the transaction with locks/semaphores (non-speculatively), the count variable is decremented, or incremented depending on the design, to represent the amount of times the transaction has been executed, and the transaction is started. Lines 10 through 12 include any amount of operations within a critical section in transaction 440. Finally, line 14 includes a check instruction for probing the transaction tracking logic/buffer, discussed above, for invalidating accesses made by a remote agent during the execution of the transaction.

Figure 5:
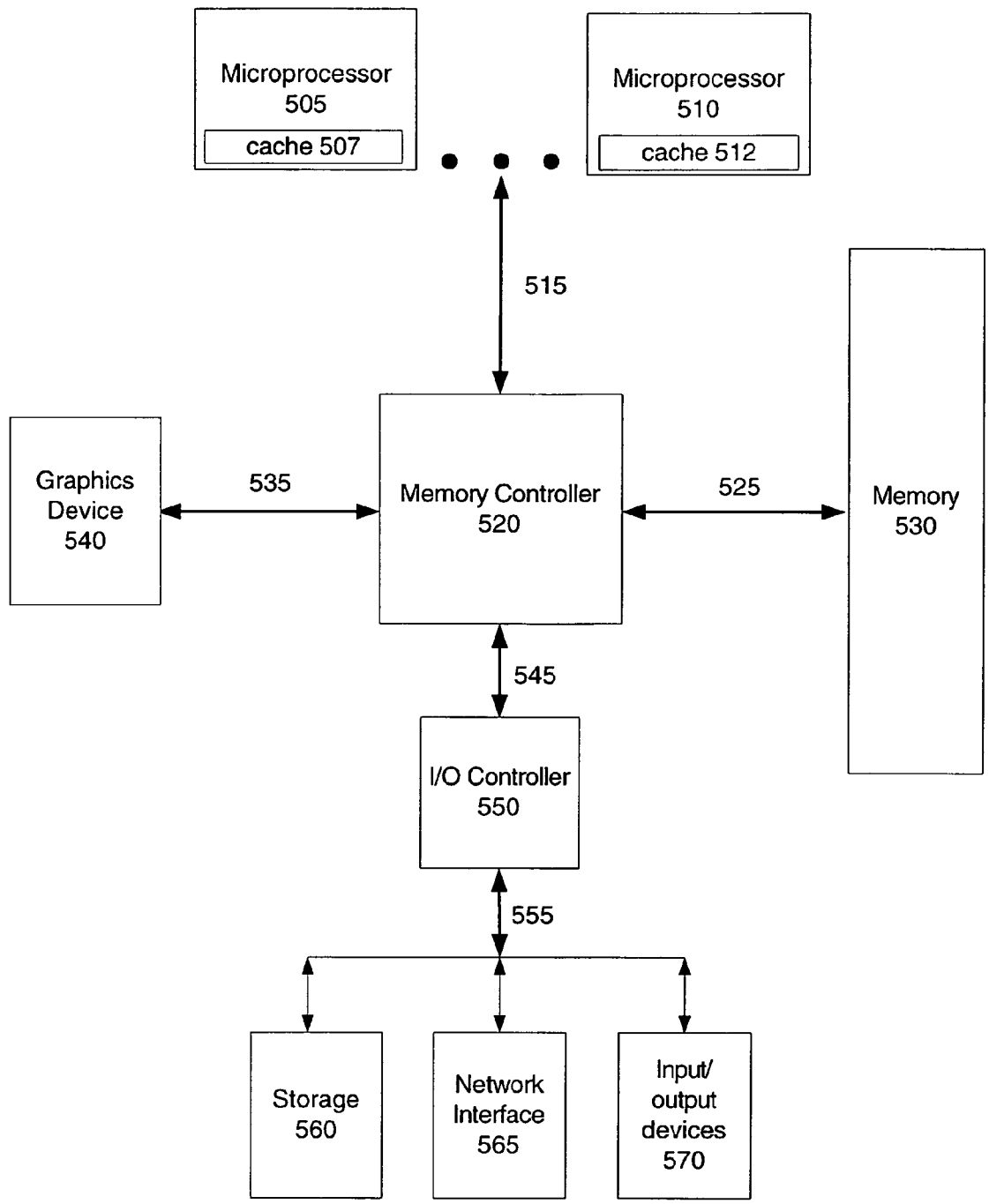
FIG. 5 illustrates an embodiment of transaction execution in a system.

Turning to FIG. 5, an embodiment of a system using transactional execution is shown. Microprocessors 505 and 510 are illustrated, however, the system may have any number of physical microprocessors, each physical microprocessor having any number of cores or any number of logical processors utilizing transactional execution. As an example, microprocessors 505 and 510 each have a plurality of cores present on their die, each core having a plurality of threads resulting in multi-threading cores. In one embodiment, micro-processor 505 and 510 are capable of out-of-order speculative and non-speculative execution. In another embodiment, microprocessor 505 and 510 are capable of only in-order execution.

Microprocessors 505 and 510 have caches 507 and 512. In one embodiment, caches 507 and 512 store recently fetched data and/or instructions from system memory 530. In this embodiment, cache 507 and cache 512 would cache data private to their respective microprocessors. Memory 530 may be a shared memory that transactional execution is used to access. In another embodiment, any memory present in the system accessed during a transaction is a shared memory. For example, if microprocessors 505 and 510 accessed a higher level shared cache, not depicted in FIG. 5.

Microprocessors 505 and 510 are shown coupled to memory controller 520 by interconnect 515. Memory controller is coupled to graphics device 540 by interconnects 535, respectively. In one embodiment, graphics device 540 is integrated in memory controller 520. Memory controller is also coupled to system memory 530 by interconnect 525. System memory 530 may be any type of access memory used in a system. In one embodiment, system memory 530 is a random access memory (RAM) device such as a static random access memory (SRAM), a dynamic random access memory (DRAM), a single data rate (SDR) RAM, a double data rate (DDR) RAM, any other multiple data rate RAM, or any other type of access memory.

Input/Output (I/O) controller 550 is coupled to memory controller 545 through interconnect 545. I/O controller 550 is coupled to storage 560, network interface 565, and I/O devices 570 by interconnect 555. In one embodiment, storage 560 is a hard-drive. In another embodiment storage 560 is a disk drive. In yet another embodiment, storage 560 is any static storage device in the system. In one embodiment, network interface 565 interfaces with a local area network (LAN). In another embodiment, network interface 565 interfaces with a larger network, such as the internet. Input/output devices 570 may include any user input or system related output devices, such as a keyboard, mouse, monitor, or printer.

Figure 6:
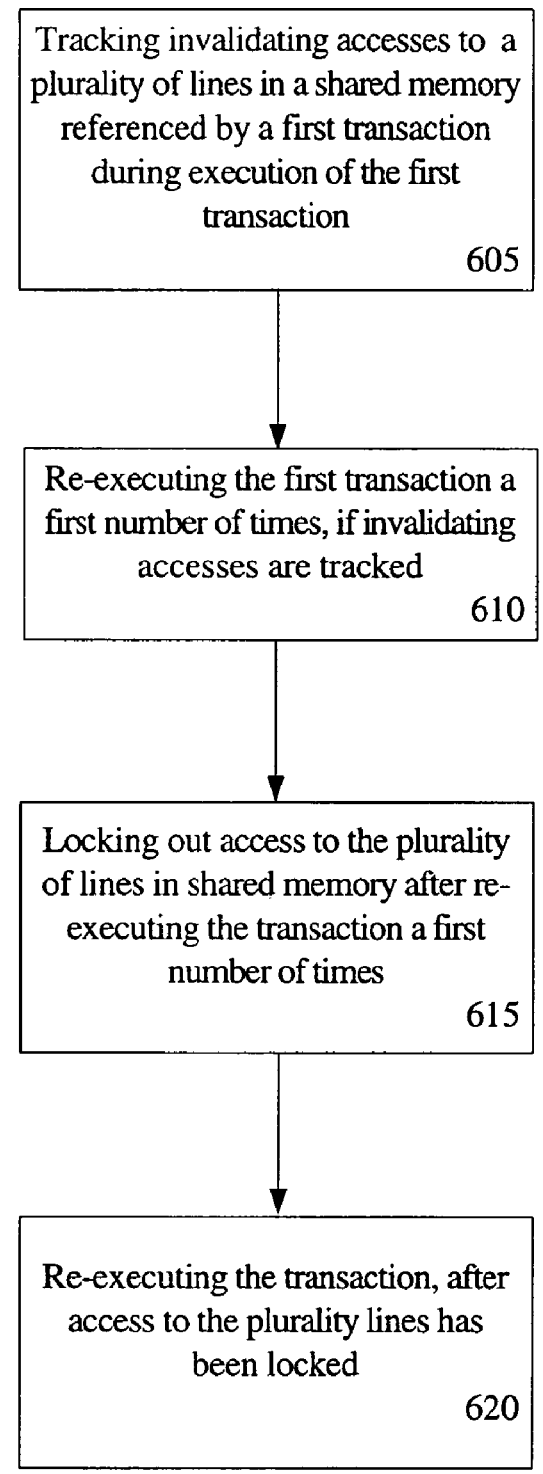
FIG. 6 illustrates an embodiment of a flow diagram for a method of executing a transaction.

Referring next to FIG. 6, an embodiment of a flow diagram for a method of executing a transaction is illustrated. In block 605, during execution of a first transaction, invalidating accesses to a plurality of lines in a shared memory referenced by the first transaction are tracked.

In one example, a transaction buffer is used to track the invalidating accesses. The transaction buffer includes a load table and a store table/buffer. The load table tracking invalidating accesses to addresses loaded from during execution of the first transaction. Invalidating accesses to addresses/memory locations loaded from include a remote agent, such as a processor, core, thread, or logical processor, not scheduled to execute the first transaction, writing to an address or memory location loaded from during execution of the first transaction. Additionally, the load table may include a lockout mechanism entry to track invalidating accesses to a semaphore or other lockout mechanism during execution of the transaction. In this example, an invalidating access to the lockout mechanism includes a remote agent requesting or obtaining a lock on an address guarded/locked by the lockout mechanism.

The store table/buffer working similarly to the load table tracks invalidating accesses to addresses or memory locations that are to be written to upon commitment of the transaction. An invalidating access here may include a remote agent either reading from or writing to the aforementioned addresses or memory locations.

In block 610, the first transaction is re-executed a first number of times, if invalidating accesses are tracked. Therefore, if an invalidating access is tracked during execution of the first transaction, the first transaction is merely re-executed. However, if the first transaction has been re-executed a predetermined number of times, which may be represented by a count variable in software or logic within a processor, the plurality of lines in shared memory referenced by the first transaction are locked. Locking may occur through a software implemented lockout mechanism, such as a semaphore, which locks out or gives exclusive access to one processor the plurality of lines. Locking may also occur through hardware utilizing lockout logic to physically lockout access to the plurality of lines referenced by the first transaction.

In block 620, the transaction is re-executed again, after access to the plurality of lines has been locked. Therefore, the processor, which may be a core or a logical processor that was re-executing the transaction speculatively, but failing to commit the results because invalidating accesses were tracked, would have exclusive access to the plurality of lines referenced by the first transaction. Consequently, the first transaction may be executed non-speculatively, since exclusive access is available to the executing processor.

Figure 7:
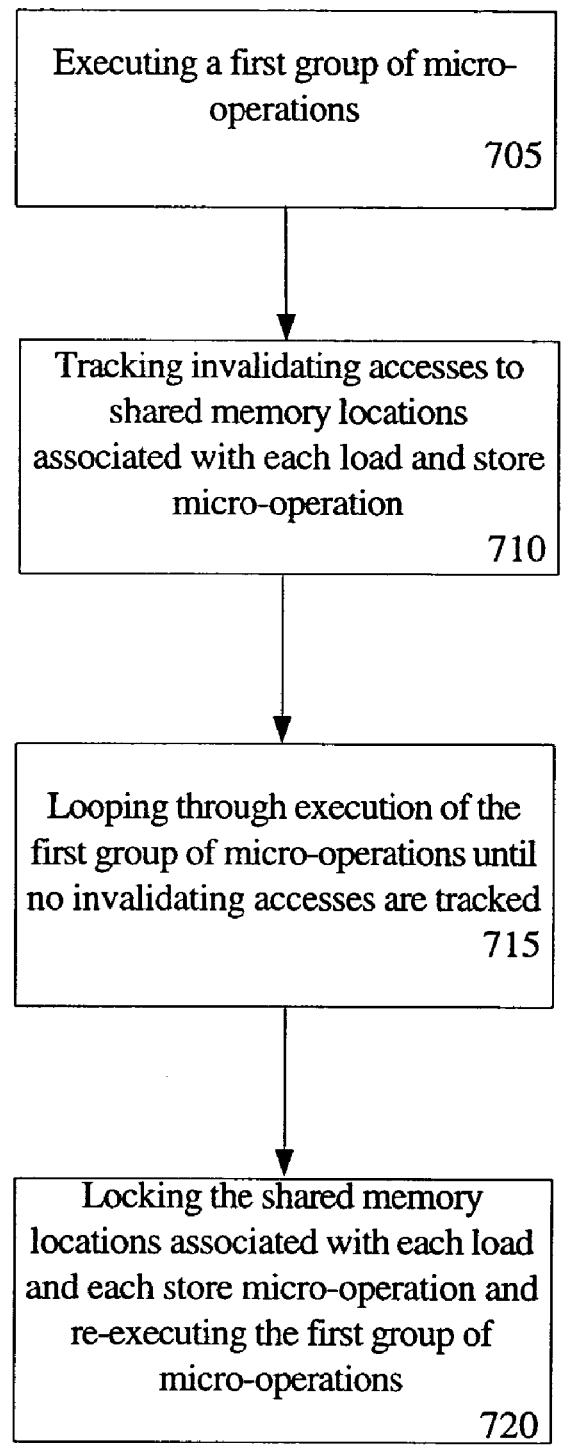
FIG. 7 illustrates an embodiment of the code flow for transactional execution.

Turning now to FIG. 7, an embodiment of the code flow for transactional execution is shown. In block 705, a group of micro-operations, which when grouped together may span multiple instructions or macro-operations, are executed. As above, in block 710, invalidating accesses to shared memory locations associated with each load and store micro-operation are tracked.

In block 715, the execution of the first group of micro-operations is looped through until (1) no invalidating accesses are tracked or (2) the first group of micro-operations have been executed a first number of times. Therefore, instead of having to jump to a new location in the code, the same input register set may be used and the transaction simply looped through again. As stated above, this is accomplished by biasing the input register set from receiving new data during the pendancy of the transaction, as well as spilling and refilling an input register's contents upon re-use of the input register. On again in block 720, the shared memory locations associated with each load and each store micro-operation are locked and the first group of micro-operations are re-executed.

Transactional execution as described above avoids the false contention that potentially occurs in locking architectures and limits contention to actual contention by tracking invalidating accesses to memory locations during execution of a transaction. Furthermore, if the transaction is re-executed a predetermined number of times, because actual contention continues to occur, then the transaction is non-speculatively executed utilizing locks/semaphores to ensure the transaction is executed and committed after trying to speculatively execute the transaction the predetermined number of times. Alternatively, a software non-blocking mechanism might be employed instead of a non-speculative execution method. As noted above, speculative register state updates/commits can be supported in software by ensuring that the "live-in" data of the transaction is preserved, either in the original input registers, or by copying the input data values to a save location, which may be either other registers or memory, from which they can be restored if the transaction must be retried. A processor may also contain hardware mechanisms to buffer the register state, possibly using a mechanism typically used to support out-of-order execution In the foregoing specification, the invention has been described with reference to specific exemplary embodiments thereof It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
execution logic adapted to execute a transaction,
a cache memory adapted to hold data referenced by the transaction,
a register coupled to the execution logic and the cache memory, the register being adapted to be updated with new data during the execution logic executing the transaction wherein the register is adapted to be biased against receiving subsequent new data after being updated with the new data and after starting execution of the transaction,
logic adapted to abort the transaction and restore the register to old data from before a start of the execution logic executing the transaction in response to tracking an invalidating request during the execution logic executing the transaction.

2. The apparatus of claim 1 further comprising a second storage element to hold a locking predicate value, when set to a locked value, the execution logic is to execute the transaction non-speculatively using a semaphore to provide exclusive access to the data element in the cache memory during execution of the transaction.

3. The apparatus of claim 2, wherein logic is further to evaluate a count variable in response to aborting the transaction, and to set the locking predicate to the locked value, if the count variable represents the transaction has been re-executed a predetermined number of times.

4. A method comprising:
executing a transaction with execution logic;
tracking if invalidating accesses to cache memory locations in a cache memory associated with a plurality of load operations within the transaction occur during executing the transaction with the execution logic, wherein the cache memory is coupled to the execution logic;
biasing live-in input registers coupled to the execution logic and the cache memory, from receiving subsequent new data during a pendency of the transaction after the live-in input registers have been updated with new data during executing the transaction with the execution logic; and
restoring the live-in input registers to old data from before executing the transaction with the execution logic in response to tracking invalidating accesses to the cache memory locations in the cache memory occurring during executing the transaction with the execution logic.

5. The method of claim 4, tracking if invalidating accesses to cache memory locations in a cache memory associated with a plurality of load operations within the transaction occur during executing the transaction with the execution logic comprises: storing a load entry in a load table for each of the plurality of load operations, each load entry comprising a representation of a physical address associated with the cache memory location loaded and an invalidating access field to (1) hold a first value, upon storing the load entry in the load table and (2) hold a second value in response to an invalidating access occurring during executing the transaction with the execution logic.

6. The method of claim 5, wherein tracking if invalidating accesses to cache memory locations in a cache memory associated with a plurality of load operations within the transaction occur during executing the transaction with the execution logic further comprises: storing a write entry in a write table for each write-operation within the transaction, each write entry comprising a representation of a physical address associated with the cache memory location to be written to, a data field to store data to be written to the physical address associated with the cache memory location to be written to, and an invalidating access field to (1) store a first value, upon storing the write entry in the write table and (2) store a second value, if an invalidating access occurs during executing the transaction with the execution logic.

7. The method of claim 5, further comprising
looping through execution of the transaction until either (1) no invalidating access is tracked to any cache memory location associated with the plurality of load operations within the transaction; or (2) the transaction has been looped through a first number of times; and
locking a plurality of cache memory locations associated with each of the plurality of load operations and re-executing the transaction in response to looping through execution of the transaction the first number of times.

8. The method of claim 5, wherein the load table is implemented in an advanced load address table (ALAT).

9. The method of claim 5, wherein the load table is held in a system memory, the load table being updated in response to execution of operations within the transaction.

* * * * *